United States Patent
Read et al.

(10) Patent No.: US 9,045,991 B2
(45) Date of Patent: Jun. 2, 2015

(54) COMPOSITE AEROFOIL

(75) Inventors: Simon Read, Belper (GB); Bijoysri Khan, Derby (GB)

(73) Assignee: COMPOSITE TECHNOLOGY AND APPLICATIONS LIMITED, Derby (GB)

( * ) Notice: Subject to any disclaimer, the term of this patent is extended or adjusted under 35 U.S.C. 154(b) by 524 days.

(21) Appl. No.: 13/546,647

(22) Filed: Jul. 11, 2012

(65) Prior Publication Data

US 2013/0029117 A1    Jan. 31, 2013

(30) Foreign Application Priority Data

Jul. 27, 2011 (GB) .................................. 1112870.9

(51) Int. Cl.
*F01D 5/28* (2006.01)

(52) U.S. Cl.
CPC ......... *F01D 5/282* (2013.01); *Y10T 428/24942* (2013.01); *Y02T 50/672* (2013.01); *Y02T 50/673* (2013.01)

(58) Field of Classification Search
CPC ...................................................... F01D 5/282
See application file for complete search history.

(56) References Cited

U.S. PATENT DOCUMENTS

| | | | |
|---|---|---|---|
| 4,810,167 A * | 3/1989 | Spoltman et al. | 416/230 |
| 5,486,096 A | 1/1996 | Hertel et al. | |
| 2010/0254821 A1 * | 10/2010 | Parkin et al. | 416/241 R |

FOREIGN PATENT DOCUMENTS

EP    0 526 057 A1    2/1993

OTHER PUBLICATIONS

Oct. 17, 2011 British Search Report issued in Application No. GB1112870.9.

* cited by examiner

*Primary Examiner* — Richard Edgar
(74) *Attorney, Agent, or Firm* — Oliff PLC

(57) ABSTRACT

A composite aerofoil, the aerofoil having a leading edge, a trailing edge a pressure side and a suction side and comprising an outer erosion protection layer along one or both of the pressure side or suction side, a structural core having a plurality of resin impregnated plies of unidirectional fibers, and between the outer erosion protection layer and the structural core a woven composite impregnated with a resin having a modulus of elasticity greater than that of the resin impregnating the plies in the structural core.

15 Claims, 2 Drawing Sheets

COMPOSITE AEROFOIL

The present invention relates to composite aerofoils and in particular composite aerofoils for aircraft and particular aerofoils in a turbine engine.

Aerospace composite components tend to be constructed from unidirectional carbon fibre laid up ply-by-ply into a laminate and the plies bonded together using a resin. The resin may be injected into the preform in a process known as resin transfer moulding (RTM) or may already be present in the plies with the plies being supplied as a pre-impregnated or pre-preg material. The composite then goes through a series of further processes including a heat cycle to cure the resin.

Aerospace composites may be used to form aerofoils such as blades or vanes in an engine or fuselage components such as wings, struts, rudders etc. Any exposed composite aerospace component can be subject to foreign object damage (FOD). These are usually small mass projectiles (e.g. gravel, bolts, etc.) travelling at relatively high speeds (100-500 m/s). The characteristic damage following these events is localised and depends on the severity of the impact. Low energies can result in minor matrix damage adjacent to the impact site. As the energy increases, this damage becomes more widespread. Further increases may result in this damage coalescing and forming delaminations. There may also be localised fibre damage on the proximal surface and spalling near the distal surface.

It is an object of the invention to seek to provide an aerofoil offering advantages.

According to the invention there is provided a composite aerofoil, the aerofoil having a leading edge, a trailing edge a pressure side and a suction side and comprising an outer erosion protection layer along one or both of the pressure side or suction side, a structural core having a plurality of resin impregnated plies of unidirectional fibres, and between the outer erosion protection layer and the structural core a woven composite impregnated with a resin having a modulus of elasticity greater than that of the resin impregnating the plies in the structural core.

The outer erosion protection layer may have a hardness between Shore A50 and Shore D 60. Preferably the hardness is Shore A 90. The outer erosion protection layer may be polyurethane.

The resin impregnating the structural core may be an epoxy resin.

The resin impregnating the woven composite may be a thermosetting nitrile phenolic adhesive.

According to a second aspect of the invention there is provided a method of manufacturing a composite aerofoil comprising the steps of providing a structural core having a plurality of resin impregnated plies of unidirectional fibres, the resin within the plies having a predetermined modulus of elasticity; providing a woven composite impregnated with a resin having a modulus of elasticity greater than that of the resin impregnating the plies in the structural core; and consolidating the structural core and the woven layer by placing them in contact and applying heat.

The method may further comprise the step of an erosion protection layer to the woven layer.

The invention will now be described by way of example only and with reference to the accompanying figures in which.

Figure 2:
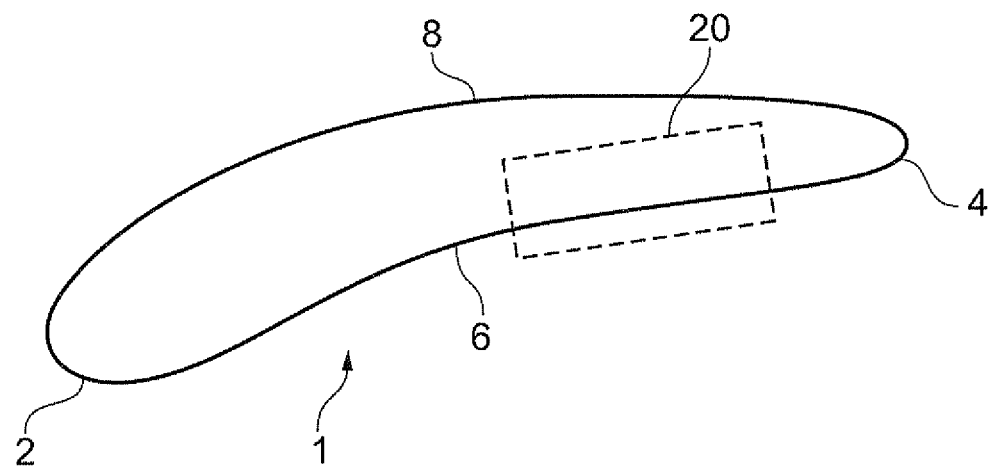
FIG. 2 depicts a chordal section of the aerofoil of FIG. 1 taken along section A-A of FIG. 1.
Figure 1:
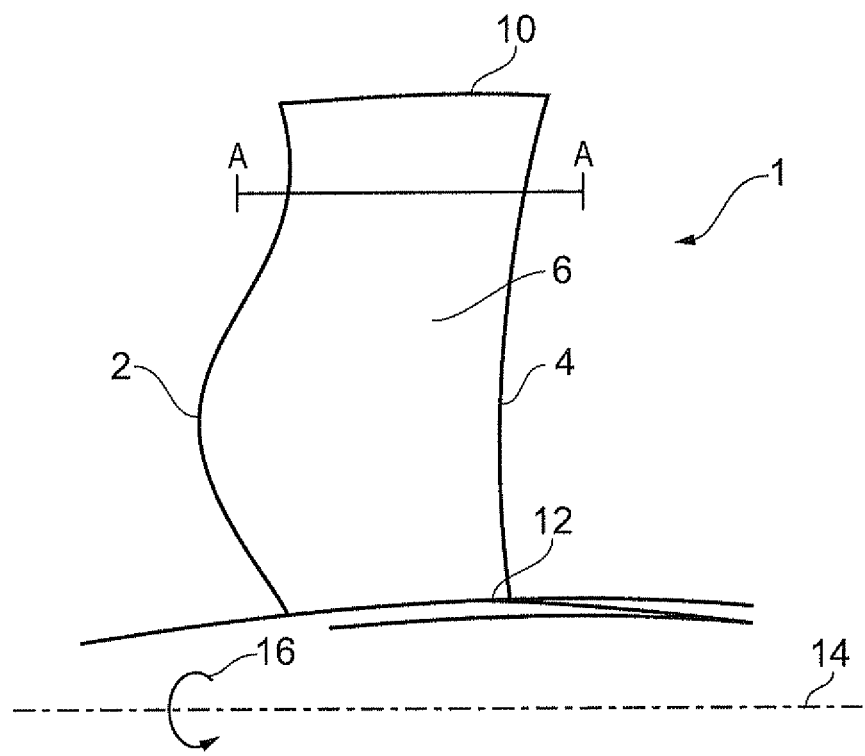
FIG. 1 depicts an aerofoil according to the present invention.
Figure 3:
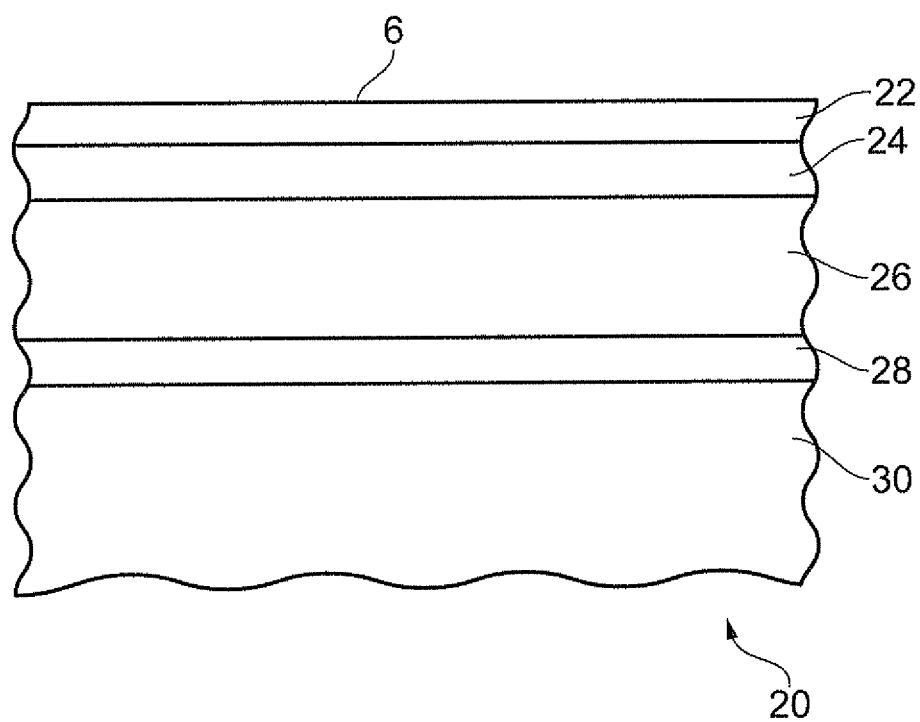

FIG. 3 depicts an expanded view of hatched box 20 of FIG. 2 showing representative layers of composite within the aerofoil FIG. 1 depicts an exemplary exterior form of an aerofoil 1 in accordance with the present invention which may be used in an axial gas turbine engine. FIG. 2 is a cross-section of the aerofoil 1 taken through section A-A of FIG. 1. The aerofoil has an axially forward leading edge 2 and an axially rearward trailing edge 4. The periphery of the aerofoil comprises flanks or sides which extend between the leading edge and training edge: a pressure flank 6 which extends along one side and a suction side 8 which extends along the other side. The aerofoil surfaces also extend from the aerofoil platform 12 to the aerofoil tip 10. The aerofoil is arranged within the gas turbine engine to rotate about the engine axis 14 in the direction of arrow 16.

FIG. 3 is a section from box 20 of FIG. 2 showing part of the internal structure of the aerofoil 1. The structure is provided by a plurality of relatively discrete layers which will be described in turn from the outer layer 22 providing the pressure surface 6 through to the blade core 30.

The outer layer 22 of the exemplary composite blade is an erosion protection layer between 0.1 and 0.5 mm thick of a material with a hardness between Shore A 50 and Shore D 60. A preferred hardness is around Shore A 90 which is possibly provided by a material such as polyurethane. The outer layer can be applied by any suitable method such as spraying or dipping or applying as a film. The outer layer is compliant to reduce the peak contact force of any foreign object (FO) impacting the blade and to alleviate the localised damage caused by the FO. It has been found that the likelihood of damage is dictated at least in part by the peak contact force.

An adhesive layer 24 having a thickness of around 0.1 mm is used to connect the polyurethane erosion protection layer to the rest of the blade. Preferred adhesives have high peel strengths, good flexibility, shear strength and have excellent adhesion to epoxy, polyurethane and optionally titanium. Two exemplary adhesives which may be used are nitrile phenolic resin that are provided in liquid or film form and known as AF32™ and AF500™ both of which are available from 3M™ as unsupported, thermosetting film adhesive. AF32 has an OLS at 75° F. (24° C.) of 3500 psi (24.1 MPa) and a peel strength measured by a metal/metal floating roller of 55 piw (9.6 N/mm). AF500 has an OLS at 75° F. (24° C.) of 6000 psi (41.4 MPa) and a peel strength of 77 piw (343 N/25 mm) measured by a metal/metal floating roller. A scrim may be used to control bonding thickness.

Bonded to the adhesive layer 24 is a woven composite layer 26 with a baseline thickness of 1 ply (around 0.25 mm) though other additional plies may be added. The weave is provided by carbon or glass fibres laid up in an appropriate pattern e.g. plain weave, 8 harness satin, 4 harness satin or 2×2 twill depending on the desired weave property. The weave is infused with the same adhesive which joins the weave to the surface layer 22. This adhesive is more flexible than the resins conventionally used to infuse composites and which has a modulus of elasticity greater than that of the resin used to make up the structural core 30 of the aerofoil.

The infusion of the weave with the adhesive material significantly improves the damage tolerance of the structure. In the event of FO impacting the aerofoil with sufficient peak force to breach to surface layer the infused woven layer inhibits the damage propagating through to the structural core 30. Where there is a significant stress concentration at the interface between the woven surface layer and the underlying unidirectional structural layers the surface layers may become detached when the structure undergoes bending.

Damage tends to propagate along the easiest route and the provision of the woven layer infused with the adhesive tends to direct any delamination away from the structural core 30 and restrict it to a more benign region.

The resilient adhesive is stronger and tougher than a resin that is optimised as a matrix material. This improves the interface strength relative to a resin matrix material and reduces the likelihood of the woven layer becoming detached as the aerofoil bends and any crack propagation into the structural core.

A further advantage of having a woven layer impregnated with the adhesive situated between the erosion layer 22 and the core 30 introduces a constrained layer damper. Although composite materials have relatively high levels of inherent damping, further reductions in blade response allow thickness reduction and therefore improved weight and aerodynamic performance. The woven layer reinforces the adhesive such that under the point of impact the resilient adhesive material thins out and expands due to the poisson's ratio of the material but the presence of the woven layer controls expansion and spreads and dissipates energy and therefore reduces vibration amplitudes. The efficiency of this strain-based damping system is improved when the polyurethane layer of stiff material is laid over the top of the elastomer by increasing the shear strain in the damping layer when the substrate is put into bending.

By adding damping to the blade it is possible to reduce the vibration response levels of the blade and correspondingly either improve the fatigue life of the blade or reduce the component thickness for a given fatigue life.

An adhesive layer 28 with a thickness of less than 0.5 mm connects the woven layer 26 with the structural core 30. The adhesive is preferably of the same material as used in layer 24 and as the infused material in the woven composite layer. The use of the adhesive in the woven composite layer can have sufficient adhesion to make the glue layer 28 redundant which beneficially can reduce the overall thickness of the aerofoil.

The structural core 30 is provided by a plurality of plies of unidirectional carbon fibres impregnated by an epoxy resin. The resin is significantly stiffer that the adhesive impregnating the woven layer and it has been found that gluing a polyurethane outer coating directly to an epoxy impregnated ply of composite can cause delamination due to the relatively large differences in stiffness between the PU layer and the epoxy. Using an adhesive with an intermediate stiffness filling woven composite between the two mediates the differences and reduces the possibility of delamination.

To assemble the composite article the structural core is initially laid up and manufactured from a series of epoxy pre-impregnated unidirectional tapes. The tapes and thus the fibres are arranged in a series of layers with the alignment of the fibres in adjacent layers being different. Alignments than may be used are +45°, −45° and 0° with the angles being measured from the radial span of the blade extending from the platform to the blade tip.

The woven layer is manufactured separately. During the initial manufacturing stages the viscosity of the adhesive is reduced by addition of a suitable solvent, by controlling the amount of cross-linking in the adhesive or by changing the viscosity of the resin by suitably activation to allow for the impregnation of the woven layer. The adhesive is then placed on a tooling surface and the woven layer applied to it. To consolidate the assembly it is held at an elevated temperature and a differential pressure is created between tool and the woven layer. The differential pressure causes the adhesive to flow into the interstices within the composite. After impregnation the cross-linking density of the adhesive is increased or the solvent evaporated to convert the material to a more tacky state to provide an assembly that may be removed from the tooling surface.

Following assembly of both the structural core and the woven layer the two are consolidated by placing in direct contact, possibly with a layer of adhesive between them and heated to cure the epoxy resin with the structural core and adhesive within the woven composite and join the two parts together.

In an alternative manufacturing process the woven layer is formed first and the pre-impregnated plies of the structural core are laid onto the woven layer and subsequently cured and consolidated.

It will be appreciated that the invention described in this application offers a number of advantages, including: improved damage resistance and tolerances for hard body impact, improved protection of the erosion protection layer local to the impact site for soft body impact, improved damping functionality, the integrity of the surface layer is improved during gross bending of the aerofoil and, because of the damping and resistance to damage, a thinner aerofoil is enabled for a given foreign object impact.

The invention claimed is:

1. A composite aerofoil, the aerofoil having a leading edge, a trailing edge a pressure side and a suction side and comprising
   an outer erosion protection layer along one or both of the pressure side or suction side,
   a structural core having a plurality of resin impregnated plies of unidirectional fibres, and
   between the outer erosion protection layer and the structural core a woven composite impregnated with a resin having a modulus of elasticity greater than that of the resin impregnating the plies in the structural core.

2. A composite aerofoil according to claim 1, wherein the outer erosion protection layer has a hardness between Shore A50 and Shore D 60.

3. A composite aerofoil according to claim 2, wherein the hardness is Shore A 90.

4. A composite aerofoil according to claim 2, wherein the outer erosion protection layer is polyurethane.

5. A composite aerofoil according to claim 1, wherein the resin impregnating the structural core is an epoxy resin.

6. A composite aerofoil according to claim 1, wherein the resin impregnating the woven composite is a thermosetting nitrile phenolic adhesive.

7. A composite aerofoil according to claim 4, wherein the erosion protection layer is between 0.1 and 0.5 mm thick.

8. A method of manufacturing a composite aerofoil comprising the steps of providing a structural core having a plurality of resin impregnated plies of unidirectional fibres, the resin within the plies having a predetermined modulus of elasticity; providing a woven composite impregnated with a resin having a modulus of elasticity greater than that of the resin impregnating the plies in the structural core; and
   consolidating the structural core and the woven layer by placing them in contact and applying heat.

9. A method according to claim 8, further comprising the step of joining an erosion protection layer to the woven layer using an adhesive layer.

10. A method according to claim 9, wherein the adhesive is a nitrile phenolic resin.

11. A method according to claim 8, wherein the resin impregnating the woven composite is a nitrile phenolic resin.

12. A method according to claim 11, wherein the resin impregnating the structural core is an epoxy.

13. A composite aerofoil according to claim 1, wherein the outer erosion protection layer is polyurethane having a hardness between Shore A 50 and Shore D 60 and the resin impregnating the structural core is an epoxy resin.

14. A composite aerofoil according to claim 1, wherein the outer erosion protection layer is polyurethane having a hardness between Shore A 50 and Shore D 60 and the resin impregnating the woven composite is a thermosetting nitrile phenolic adhesive.

15. A composite according to claim 14, wherein the resin impregnating the structural core is an epoxy resin.

* * * * *